UNITED STATES PATENT OFFICE.

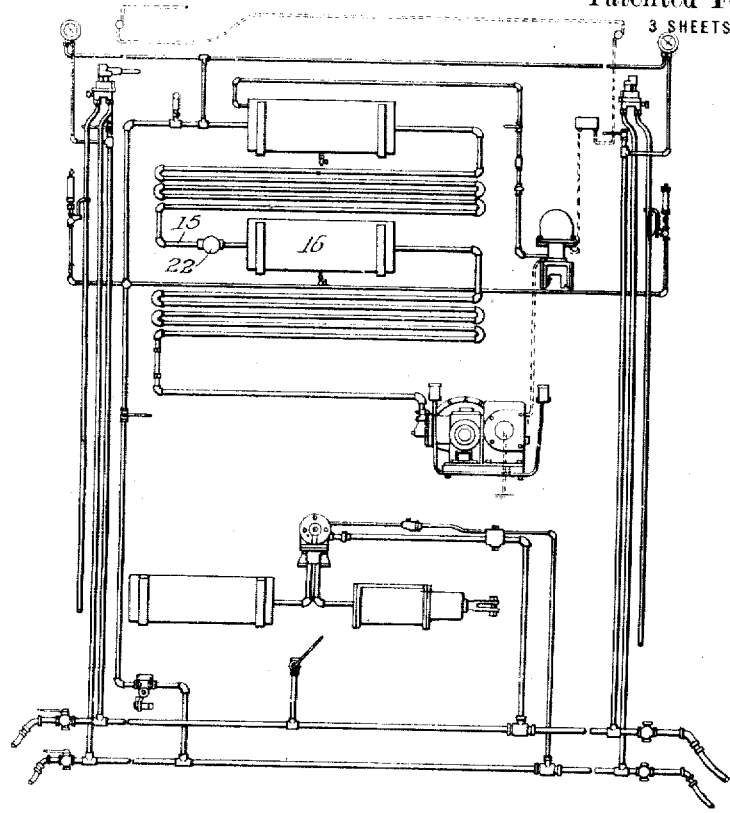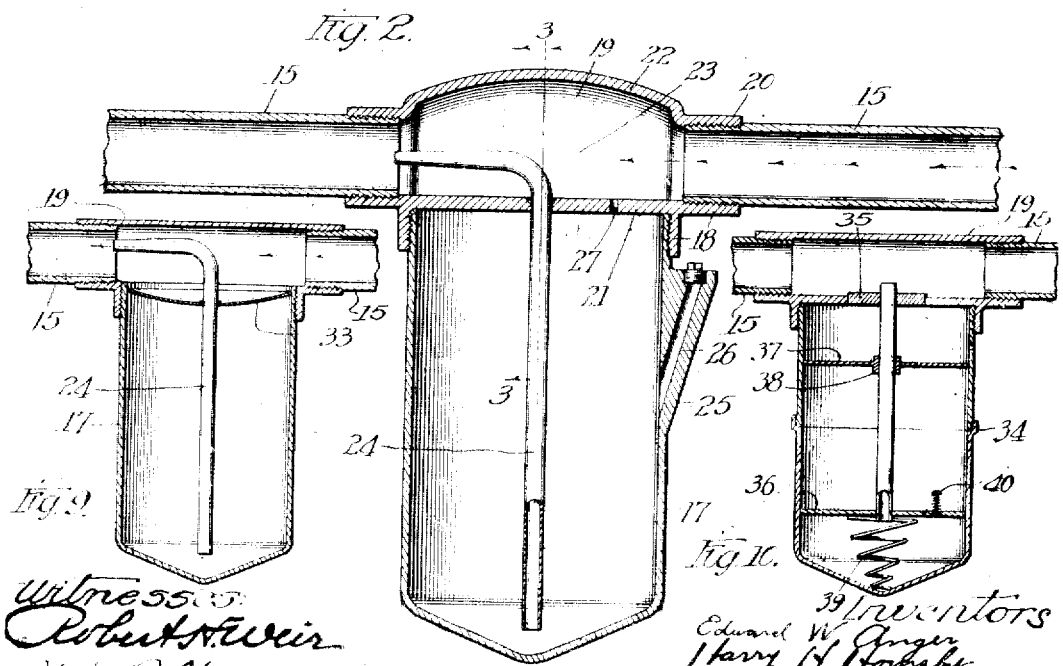

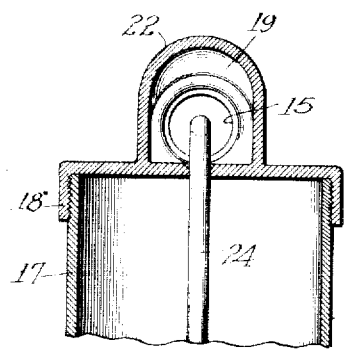
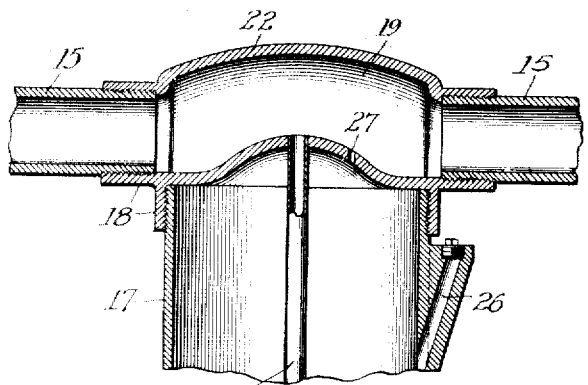
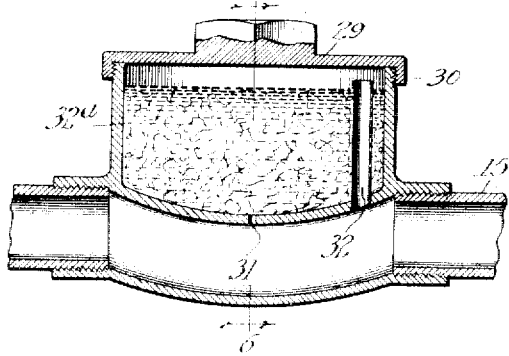
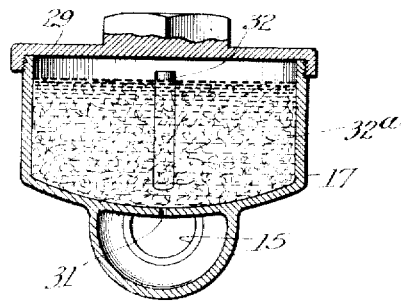
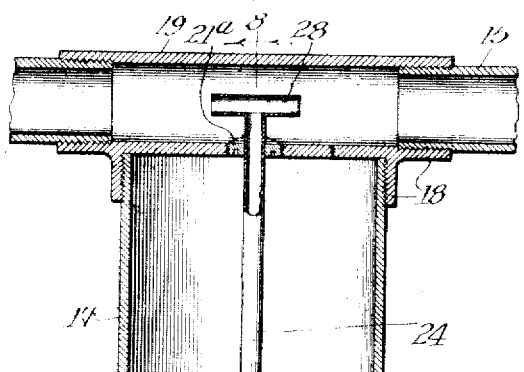
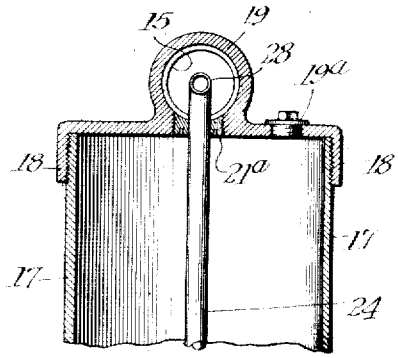

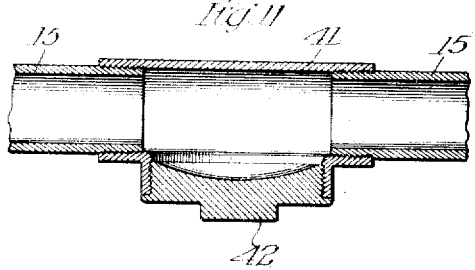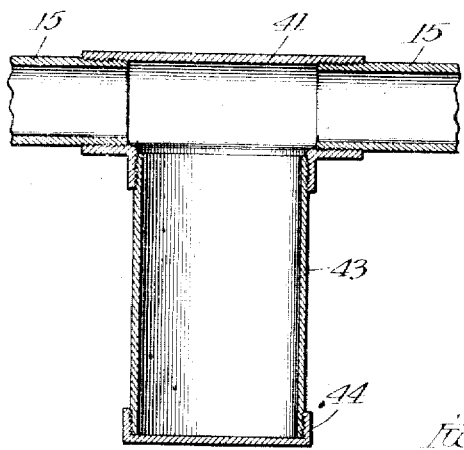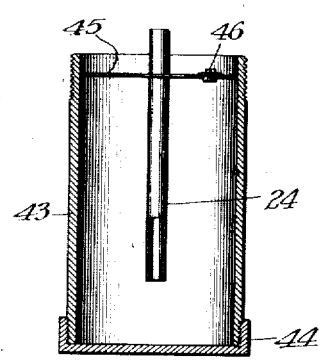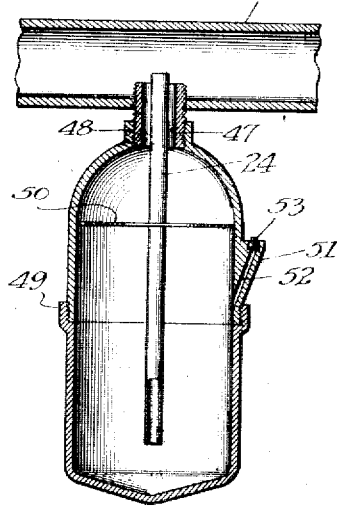

EDWARD W. ANGER AND HARRY H. HORNSBY, OF CHICAGO, ILLINOIS.

SAFETY MEANS FOR PREVENTING AND REMOVING ICE AND OTHER OBSTRUCTIONS IN FLUID-PRESSURE SYSTEMS.

1,171,014.  Specification of Letters Patent.  Patented Feb. 8, 1916.

Application filed January 23, 1915. Serial No. 3,893.

*To all whom it may concern:*

Be it known that we, EDWARD W. ANGER and HARRY H. HORNSBY, both citizens of the United States, residing at Chicago, in the county of Cook and State of Illinois, have jointly invented new and useful Improvements in Safety Means for Preventing and Removing Ice and other Obstructions in Fluid-Pressure Systems, of which the following is a full, clear, concise, and exact description, reference being had to the accompanying drawings, forming a part of this specification.

Our invention relates to an improved method of keeping the pipes, tanks, valves and the like of air systems in which there is a flow of air, free from frost, ice, dirt and like obstructions, and to the apparatus by means of which this method is carried out.

Systems using air, usually under greater than atmospheric pressure, are frequently rendered inoperative due to the so-called freezing of the system. It is well known that moisture will collect in pneumatic air systems, due primarily to the moisture ever present in the ordinary atmosphere. It follows that when such systems are used in climates where the temperature reaches the freezing point, the moisture and water of condensation will become frosted or frozen. The inoperativeness of the system resulting from such frosting or freezing is in all cases a source of trouble and expense, but in some instances, for example, the case of systems used for setting brakes on trains, street cars and the like it becomes not only troublesome and expensive but dangerous as well. It can never be foretold at what precise moment the system will become inoperative due to this accumulation of ice or frost in the pipes, and it frequently happens at a time when the safety of a large number of people depends on the proper control of the car and its braking equipment.

Obviously it is inexpedient and dangerous to operate a car under a hand brake only, especially when such car forms part of a train. So it is the general custom when a car's braking system is rendered useless to remove such car from the lines for the purpose of thawing out the ice or frost at the nearest barns or repair station. Such a procedure entails certain signal disadvantages and is open to several objections. It causes the loss of at least one car to the service and it will be obvious that such an objection is a serious one, especially in large cities where every available car is needed to handle the heavy traffic. It furthermore upsets the schedule and routine of the traffic system which causes no little annoyance and expense. The cure for "frozen" cars generally practised is troublesome and dangerous. It is the custom to thaw out the frozen parts by means of oil torches and the like. In the first place it is always difficult to ascertain the location of the trouble and such practice is more or less unsafe in view of the danger from fire. There are other objectionable results from such freezing. For example, in the case of cars that have been standing in the open or in cold places it is impossible to drain the tanks or reservoirs of the condensed water and oil. Again, in the case of trains, which ordinarily use the automatic brake system, as soon as a freeze occurs in the system the brakes on all cars in the rear of the freeze will set.

Another cause of trouble found in systems of the sort mentioned is the accumulation of oil and dirt which forms a gum-like substance that clogs the valves and other parts resulting, often, in the necessity for removing the car from service for cleaning and overhauling.

It is one of the objects of our invention to obviate the various objections and disadvantages noted by providing means for preventing or removing the formation of ice or frost, or the accumulation of oil and grease.

It is a further object of our invention to provide means for attaining such ends effectively, economically, safely and easily.

It is still a further object of our invention to provide apparatus for carrying out this method that is simple, compact and durable, economical to manufacture, easy to install in existing systems as well as new ones, readily accessible for examination and the like, and efficient in operation.

Additional objects and advantages of our invention will be apparent from the following description taken in connection with the appended claims and the accompanying drawings, in which—

Figure 1 illustrates diagrammatically, by way of example, the air brake system of the ordinary electric car as used in trains of several cars having apparatus embodied therein in accordance with our invention:

Fig. 2 is a cross sectional view of that apparatus, enlarged; Fig. 3 is a cross sectional view of the same, with parts broken away and removed, the section being taken on the line 3—3 of Fig. 2, looking in the direction of the arrows; Figs. 4 and 5 are views similar to Fig. 2 of modifications of the apparatus shown therein; Fig. 6 is a cross sectional view of the apparatus shown in Fig. 5 the section being taken on the line 6—6 of Fig. 5 looking in the direction of the arrows; Fig. 7 is a view, similar to Fig. 2, of a further modification; Fig. 8 is a cross sectional view of the apparatus shown in Fig. 7, the section being taken on the line 8—8 of Fig. 7, looking in the direction of the arrows; Figs. 9 and 10 are views similar to Fig. 2, but reduced, of further modifications; Fig. 11 is a view in cross section showing a portion of the piping and a modified form of passage forming member with the container removed; Fig. 12 is a similar view with a modified form of container in place; Fig. 13 is a cross sectional view of a container which may be substituted for that shown in Fig. 12; and Fig. 14 is a vertical cross sectional view of a further modification.

The method we provide for keeping the pipes, tanks, valves and the like of the system free from the obstructions mentioned is to cause to be injected into the air of the system, preferably intermittently, and preferably in small quantities, an agent such as alcohol, for example, which forms with moisture or water a mixture (popularly, rather than necessarily technically speaking) tending to prevent the existence of ice or frost and of such a character that it will "cut" accumulations of oil and grease. Although there are various agents which will meet these requirements, the one we prefer is denatured alcohol which we have found to be efficient and economical in operation.

This method is carried out by placing at some suitable point or points in the system, as for example, just beyond the air reservoir, a container having a member or portion associated therewith forming a passage in communication with the path of the flowing air of the system. Liquid of the sort described, as for example, denatured alcohol, being placed in the container, its injection into the pipes of the system is attained in a number of ways. For example, a tube may be secured into the container one end of which dips into the alcohol, or other liquid, the other end of which opens into or near the passage above mentioned. Operation of the system causes a certain amount of the alcohol to be drawn through the tube and injected into the system. The injection of the liquid or its vapor, or both, may be accomplished in other ways as more fully appears hereinafter. In any case the mixture of the alcohol or its vapor with the moisture ever present in the system has the tendency before described, namely to prevent formation of ice or frost or cause ice or frost already formed to melt. When alcohol or the like is mixed with water a certain amount of heat is generated and the freezing point, and melting point, of the mixture is lower than that of water. As a result of one or more of these facts the mixture tends to melt any ice already formed and to prevent the formation of any new ice; in other words it tends to prevent the existence of ice, as described. The alcohol also cuts oil or grease and thus prevents the accumulation of the gum-like substance before mentioned.

Referring to the drawings which illustrate various forms of apparatus by means of which this method is carried out, 15 represents a portion of the pipe line of a system of the sort described, as for example, that portion of the pipe which leads from the air reservoir 16 of the air brake system of a car forming part of a train, such a system being diagrammatically shown in Fig. 1. This pipe has a portion cut out as shown to provide space for the insertion of the containing and distributing apparatus. The latter comprises, in this instance, a tank or receptacle 17 which hangs below the pipe (Figs. 1 and 2) and is screw-threaded on the exterior of its open upper end whereby it may be secured to the correspondingly screw threaded flange 18 of a passage forming member 19. This member has also two screw threaded nipples 20 by means of which it is attached to the adjacent ends of the pipe 15. The receptacle 17 is closed at the top by the base 21 of the member 19 and this base with the hood-like top 22 of the member 19 forms a passage 23 for the flowing air of the system which is, in effect, a continuation of the piping 15. Communication between the receptacle and this passage is provided by a tube 24 which is secured into the base 21 and has one end extending nearly to the bottom of the receptacle and the other end opening into the passage 23. In the form shown in Fig. 2 this opening is at the end of an arm of the tube extending in line with the flow of air and formed by bending the tube through about 90° just above the base 21. On the side of the receptacle is a shoulder 25 having therein a duct 26 by means of which the tank may be filled with the alcohol or other liquid.

When the system is operated so that a flow of air takes place through the pipe 15 and consequently through the passage 23, the flow of the air, which is in the direction of the arrows (Fig. 2), past the open mouth of the tube 24, causes an amount of the alcohol contained in the receptacle 17 to be drawn through the tube and injected into the system, an orifice 27 in the base 21 causing this injection to be in the form of a spray. This injection of the alcohol will be accompanied ordinarily by a certain amount of alcohol vapor and both liquid and vapor mix with the water or moisture present in the system, the mixture being distributed throughout the system by the flow of air and, by its action as before described, prevents the formation of ice or frost and melts ice or frost already formed.

In some cars, as for example, freight cars, the flow of air takes place sometimes in one direction, sometimes in the other. In Figs. 4–8 we have disclosed forms of apparatus adapted to such conditions as well as to systems having a one way flow. The apparatus shown in Fig. 4 is the same as that above described except that the base 21 of the passage forming member is curved upwardly into the path of the air and the tube 24 is cut off flush with this base. As the air flows in either direction across the top of the tube it causes the alcohol to be drawn into the system as before described.

Another form of apparatus adapted to a one-way or two-way flow is shown in Figs. 7 and 8. In this latter the hood of the passage forming member is circular rather than inverted U-shaped, as in Figs. 2 and 3; the tube has at its upper end, in the air passage, a T or cross tube 28 open at both ends and in communication with the main portion of the tube; the base 21 is provided with a removable plug 21ᵃ (Fig. 7) in order that the T end of the tube may be inserted in the air passage in its proper position; and the receptacle is filled by means of a stoppered port 19ᵃ in the passage forming member itself, instead of by the duct shown in Fig. 2. Otherwise the construction of this form is similar to the form shown in Fig. 2. When the system is operated, some of the air, whether the flow is in one direction or the other, will pass through the T or cross tube 28 and draw a stream or spray of alcohol through the main tube into the passage, as before described.

It may be at times desirable to have the alcohol feed in other ways, as for example, by gravity. A form of apparatus with gravity feed is shown in Figs. 5 and 6. The receptacle in this instance is above the pipe and the parts corresponding to the base 21 and hood 22 of the passage forming member 19, which are curved slightly downward, are formed integral with the receptacle. Access to the interior for filling and packing is provided by a cap 29 which has a flange 30 screw threaded on the interior to engage the screw threaded end of the receptacle.

In the base is a drip vent 31 and an equalizing tube 32, the latter extending up into the receptacle. The latter may be partially filled with packing material 32ᵃ, such for example, as cotton waste, and the character of the drip may be regulated by the size of the vent or the character and amount of the packing.

The flow of air may cause the alcohol to be fed in other ways. The apparatus shown in Fig. 9 has a receptacle and passage forming member similar to that shown in Fig. 7, except that the base of the member is removed and in its place is a flexible diaphragm 33. A tube similar to the tube shown in Fig. 2 is secured to this diaphragm. When operation of the system occurs the flow of air flexes the diaphragm downwardly carrying the tube with it, thereby causing a flow of alcohol through the tube into the air passage.

Still another form of apparatus by means of which the flow of air can cause the injection of alcohol is shown in Fig. 10. The receptacle, for convenience in manufacture is formed in two pieces joined together as at 34. The passage forming member is similar to that shown in Fig. 7 except that it has a circular piece cut out at its center. Inserted in this opening, with a close fit, is a button 35 through which the tube is rigidly secured, its end extending a slight distance above the button and opening into the air passage. The lower end of the tube is secured to a member in the nature of a piston head 36, reciprocating in the receptacle as its cylinder, the open end of the tube being just below such piston head. A short distance below the top of the receptacle is a solid partition 37, having a bearing 38 for the tube, which serves to confine the alcohol supply and as a guide for the reciprocating tube. Supposing the receptacle to be supplied with alcohol both above and below the piston head 36, when operation of the system takes place, the flow of air acts on the button 35 to force it, and consequently the tube and piston head, downward. The alcohol below the latter being thus placed under pressure is forced to escape up through the tube into the air passage.

To return the parts to normal position we provide a coiled spring 39 which bears against the piston head and the bottom of the receptacle. As soon as the force of the air flow falls below the force of the spring the parts will move back to normal position. In the piston head is an ordinary one-way valve 40 which is closed when the parts are moving downwardly but which opens on the upward stroke to permit a fresh supply of alcohol to flow into the lower part of the receptacle to replace that just distributed.

It may be found desirable to use the simple form of apparatus illustrated in Figs. 11–13 which is especially adaptable to emergency use. The passage forming member as shown in Fig. 11 is an ordinary T-fitting 41 which is inserted in the pipe 15 and which is closed when not in use by a suitable plug 42. When it is desired the plug may be removed and a container screwed into the T-fitting. Fig. 12 illustrates a form of container readily available which consists of a short piece of pipe 43 of a size to fit the T-fitting 41, and a cap 44 closing its lower end. This container being previously filled with alcohol, is secured to the T-fitting 41, thus leaving its upper end open to the air passage. As the alcohol evaporates the vapor arising into the air passage will be distributed by the operation of the system and its mixture with the water or moisture in the system causes the generation of the requisite heat.

In place of the container just described, the form shown in Fig. 13 may be used. This form is similar to that just described except that secured in the piece of pipe 43 near the top thereof, is a partition 45 in which is secured a tube 24 of the sort previously described. In the partition is a plug 46 by means of which access to the container is obtained for the purpose of filling.

When the container has been filled and screwed into the T-fitting 41, operation of the system, by the flow of air across the open tube 24, causes an injection of alcohol into the system as before described.

It is not always necessary to cut away a portion of the pipe 15, as will appear from the modified form of apparatus illustrated in Fig. 14. Instead, a small hole is cut in the underside of the pipe and an ordinary nipple 47 inserted therein. Secured to this nipple is the container which has a collar 48, screw threaded on the interior, for engagement with the corresponding threads of the nipple.

For convenience in manufacture and assembling, the container is made in two parts joined together as at 49, the upper part curving in at the top to form the collar 48. The usual tube 24 of the sort previously described is secured in a partition 50 which extends across the container near the top thereof, the tube extending upwardly to such an extent that it passes through the nipple so as to open into the pipe 15 when the parts are in place. On the side of the container, below the partition 50, is a shoulder 51 through which is a duct 52 having a plug 53 in its outer end, this duct being for the purpose of providing access to the interior for filling. Operation of the system causes an injection of the alcohol into the system as before described.

It will be noted that the apparatus in each case is of a simple character so that it is easy and inexpensive to manufacture and to maintain. Installation is a comparatively simple matter as it is only necessary to cut a small piece of the piping out of the system and to screw-thread the adjacent ends, or to cut a hole and insert a nipple in the case of the form shown in Fig. 14, whereupon the apparatus is readily screwed into place. This means of preventing accumulation of frost, ice, oil and grease and the like is not only extremely efficacious but is comparatively inexpensive as well, as only a very slight amount of the alcohol is distributed at each operation.

Although we have described our invention in connection with the air brake system of a car forming part of a train it is in no manner limited to such use. The invention is adaptable to substantially any system in which there is a flow of air, such as pumps, drills, hammers, hoists, cutters, engines, and the like, the air brake system being chosen merely as an illustration and for convenience of description. Nor is the invention limited to the use of alcohol as there are many other agents in liquid, gaseous, or solid form, which can be used to carry out the invention, and which come within the scope of the appended claims, alcohol being taken merely as an example.

It is to be understood, therefore, that changes may be made in the form, construction and arrangement of the apparatus, identity of the agent, and the class of system with which it is used, without departing from the spirit of the invention or exceeding the scope of the appended claims, the forms of the invention herein disclosed being merely preferred embodiments thereof.

Having thus described our invention what we claim as new and desire to secure by Letters Patent is:—

1. The herein described method of preventing or removing a formation of frost or ice in the pipes, tanks, valves and the like, of a system in which there is a flow of air, which consists in causing to be injected into the air an agent which forms with moisture or water a mixture tending to prevent the existence of ice or frost.

2. The herein described method of preventing or removing a formation of frost or ice in the pipes, tanks, valves and the like of an intermittently operated air system, which consists in causing to be injected into the flowing air each time the system is operated to cause a flow of the air, an agent which forms with moisture or water a mixture tending to prevent the existence of ice or frost.

3. The herein described method of preventing or removing an accumulation of oil or grease in the pipes, tanks, valves and the like of a system in which there is a flow of air, which consists in causing to be injected into the system an agent capable of cutting the grease or oil.

4. The herein described method of preventing or removing an accumulation of frost, ice, oil or grease in the pipes, tanks, valves and the like, of a system in which there is a flow of air, which consists in causing to be injected into the fluid an agent which forms with moisture or water a mixture tending to prevent the existence of ice or frost, and capable of cutting the oil or grease.

5. The combination with a system in which there is a flow of air, of means for causing an agent which forms with moisture or water a mixture tending to prevent the existence of ice or frost to be injected into said air.

6. The combination with an intermittently operated air system, of means for causing an agent which forms with moisture or water a mixture tending to prevent the existence of ice or frost to be injected into the flowing air upon operation of the system to cause a flow of air.

7. The combination with an intermittently operated air system, of means whereby the flow upon operation of the system causes an agent which forms with moisture or water a mixture tending to prevent the existence of ice or frost to be injected into the air.

8. The combination with a system in which there is a flow of air, of means for causing an agent capable of cutting oil or grease to be injected into said air.

9. The combination with a system in which there is a flow of air, of a receptacle having communication with the path of the air and containing an agent which forms with moisture or water a mixture tending to prevent the existence of ice or frost, and means whereby said agent is injected into the air.

10. The combination with a system in which there is a flow of air, of a receptacle having communication with the path of said air and containing an agent which forms with moisture or water a mixture tending to prevent the existence of ice or frost, and means whereby said agent is intermittently injected into the air.

11. The combination with an intermittently operated air system, of a receptacle having communication with the path of the air and containing an agent which forms with moisture or water a mixture tending to prevent the existence of ice or frost, and means whereby said agent is injected into the air upon operation of the system.

12. The combination with an intermittently operated air system, of a receptacle having communication with the path of the flowing air and containing an agent which forms with moisture or water a mixture tending to prevent the existence of ice or frost, and means whereby the operation of the system causes an injection of said agent into the flowing air.

13. The combination with a portion of the piping of a system in which there is a flow of air, of a receptacle containing an agent which forms with moisture or water a mixture tending to prevent the existence of ice or frost, and a tube having one end in said agent in the receptacle and its other end in communication with said piping.

14. The combination with a system in which there is a flow of air, of a receptacle containing an agent which forms with moisture or water a mixture tending to prevent the existence of ice or frost, and a tube having one end in said agent in the receptacle and the other end disposed in such manner that the flow of said air will cause said agent to flow through the tube into the system.

15. The combination with a portion of the piping of a system in which there is a flow of air, of a receptacle containing an agent which forms with moisture or water a mixture tending to prevent the existence of ice or frost, a member associated with said receptacle forming a passage in communication with said piping, and a tube having one end in said agent in the receptacle and the other end opening into said passage.

16. The combination with a portion of the piping of a system in which there is a flow of air, said piping having a portion cut away, of a receptacle, a member associated with said receptacle having means whereby it may be inserted between the adjacent ends of said piping and forming a passage in communication with said piping, and a tube, one end of which extends into said receptacle, the other end of which opens into said passage.

17. The herein described method of preventing or removing a formation of frost or ice in the pipes, tanks, valves and the like of an air-brake system, which consists in causing an agent which forms with moisture or water a mixture tending to prevent the existence of ice or frost to be injected into the flowing air upon operation of the system to apply the brakes.

18. The combination with an air-brake system, of means for causing an agent which forms with moisture or water a mixture tending to prevent the existence of ice or frost to be injected into the flowing air upon operation of the system to apply the brakes.

19. The combination with an intermittently operated air system, of a receptacle containing an agent which forms with moisture or water a mixture tending to prevent the existence of ice or frost, means of communication between the receptacle and the path of the air, and means whereby the flow of air upon operation of the system causes a portion of said agent to be forced through said communicating means into the flowing air.

20. The combination with a system in which there is a flow of air, of a receptacle associated with a portion of the piping of the system and containing an agent which forms with moisture or water a mixture tending to prevent the existence of ice or frost, a partition between said agent and the path of the air, said partition having associated therewith means of communication between the receptacle and the path of the air through the partition.

21. The combination of an air pump, an air cylinder, an operating control valve, air pipe connections, a receptacle communicating with said piping and containing an agent which forms with moisture or water a mixture tending to prevent the existence of ice or frost, and means whereby a portion of said agent is circulated through the system at each alternate operation of the control valve.

22. The combination of an air pump, an air brake cylinder for operating a wheel brake, an operating control valve, air pipe connections, a receptacle having communication with said piping and containing an agent which forms with moisture or water a mixture tending to prevent the existence of ice or frost, and means whereby a portion of said agent is circulated through the system at each operation of the control valve to apply the brake.

23. The combination of an air pump, an air cylinder, an operating control valve, air pipe connections, a receptacle having communication with said piping and containing an agent capable of cutting oil and grease, and means whereby a portion of said agent is circulated through the system at each alternate operation of the control valve.

In witness whereof, we have hereunto subscribed our names in the presence of two witnesses.

EDWARD W. ANGER.
HARRY H. HORNSBY.

Witnesses
 ROBERT LEWIS AMES,
 ANNE SOLOMON.

It is hereby certified that in Letters Patent No. 1,171,014, granted February 8 1916, upon the application of Edward W. Anger and Harry H. Hornsby, of Chicago, Illinois, for an improvement in "Safety Means for Preventing and Removing Ice and Other Obstructions in Fluid-Pressure Systems," an error appears in the printed specification requiring correction as follows: Page 5, line 5, claim 4, for the word "fluid" read *air;* and that the said Letters Patent should be read with this correction therein that the same may conform to the record of the case in the Patent Office.

Signed and sealed this 14th day of March, A. D., 1916.

[SEAL.]

J. T. NEWTON,

*Acting Commissioner of Patents.*

Cl. 137—70.